United States Patent [19]

Hammerschlag

[11] 3,859,946

[45] Jan. 14, 1975

[54] UNDER LOAD RELEASABLE CHAIN STOPPERS

[76] Inventor: Peter G. Hammerschlag, 220 111th Ave. S.E., Bellevue, Wash. 98004

[22] Filed: Apr. 19, 1973

[21] Appl. No.: 352,402

[52] U.S. Cl. .............................. 114/200, 294/83 R
[51] Int. Cl. ........................................... B63b 21/18
[58] Field of Search .......... 114/199, 200, 218; 9/44; 254/174, 175; 294/83 R, 84; 24/241 PP, 241 SB

[56] References Cited
UNITED STATES PATENTS

| 44,621 | 10/1864 | Fletcher | 114/200 |
| 3,399,921 | 9/1968 | Trost et al. | 24/241 PP |
| 3,762,757 | 10/1973 | Epstein | 294/83 R |

*Primary Examiner*—Trygve M. Blix
*Assistant Examiner*—Galen Barefoot

[57] ABSTRACT

An under load releasable chain stopper for link chain and stud link chain, as used for instance for ship anchor chains.

It comprises a two-legged, fork-shaped chain stopper pawl, hinged in a sturdy frame and extending beyond the pivot. There it is prevented from rotating by a first release pin, which has locally a cut-out, such that the chain stopper pawl can be released by turning the release pin a quarter turn. This first release pin has attached to it a first lever resting against a similar but smaller second release pin, which can release the first lever by being turned a quarter turn.

The second release pin has attached to it a second lever, which rests against a sliding member, which can release the second lever by being translated out of its way, either by hand or by a remotely operated translating device like an air or hydraulic cylinder. Reading out the load on the chain can be achieved by a load cell replacing one of the stops preventing the sliding member to rotate.

6 Claims, 8 Drawing Figures

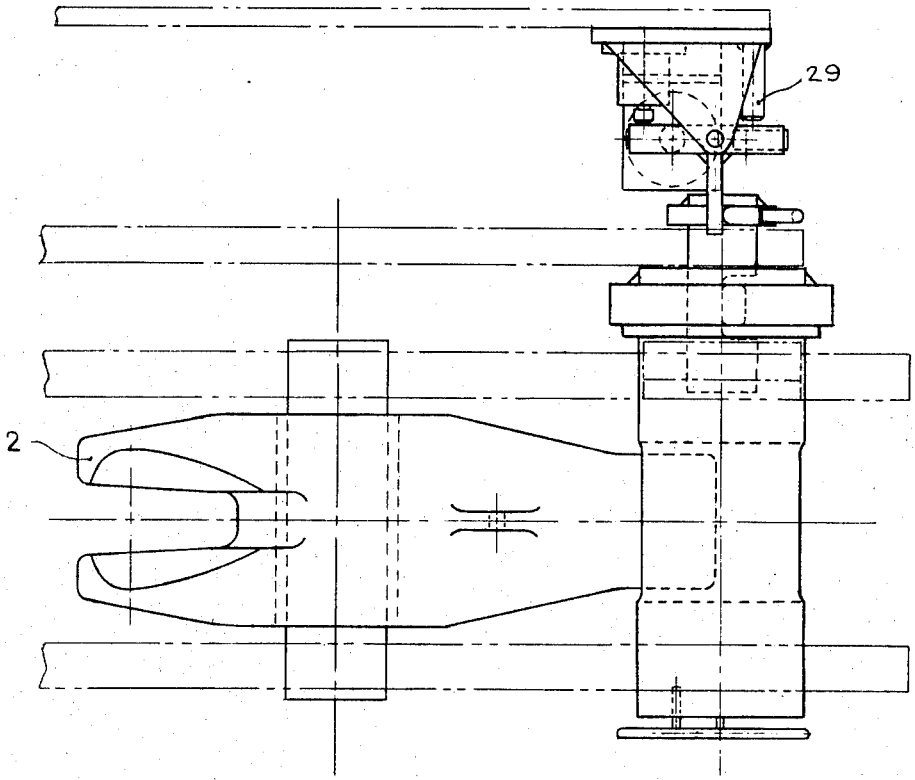
FIG. 3
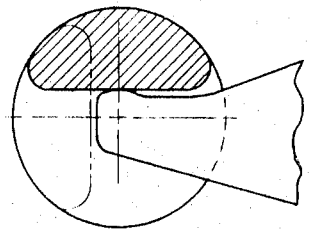
FIG. 6
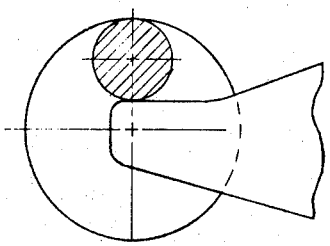
FIG. 7
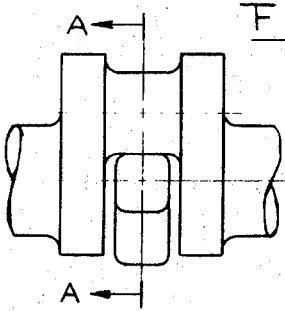
FIG. 8
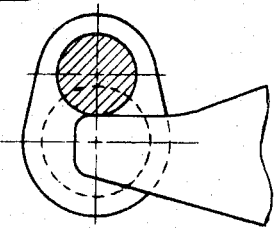

UNDER LOAD RELEASABLE CHAIN STOPPERS

BACKGROUND OF THE INVENTION

Presently used chain stoppers for link chain and stud link chain, used for instance on board of ships as anchor chain, are either of the "pawl" type or of the type known as "devil's claw."

The pawl type chain stopper consists of a pawl hinged between the upward legs of a sturdy U-shaped frame through which the chain slides. The chain is jammed between the pawl and the bottom of the U-shaped frame. To disengage it, the chain has to be pulled back, after which the pawl can be freed by hand and locked in a non-engaging position with a latch.

The devil's claw consists of a twin hook, somewhat like a two-legged fork of which the legs are bent into hooks. These hooks hold a link of the chain while the next link of the chain can hang between them. This fork-type hook is mostly tied to the deck of a ship by means of a number of chain links, shackles and a turnbuckle. Just as with the pawl type chain stopper, to disengage it, the chain has to be pulled back, allowing the devil's claw to fall out or to be taken out.

The two described methods of holding a chain have been satisfactory for conventional ships. The introduction of vessels used as drilling rigs in more recent years however made it desirable to be able to hold an anchor chain such that it can be released under load, that is without having to pull the chain back. This because of the time delay involved and also because the load on the chain may be significantly higher than the anchor windlass can pull back; these windlasses often being designed to a chain's maximum working load, not its maximum breaking strength.

It was also considered desirable to be able to release the chain stopper remotely and in some cases to have a read-out of the tension in the chain incorporated in the chain stopper assembly.

SUMMARY OF THE INVENTION

In view of the foregoing it is an object of the present invention to provide a chain stopper which can be released under load, remotely if necessary and which, if desired, can be provided with means to read the load on the chain.

Briefly, the chain stopper of the present invention comprises a two-legged fork-shaped chain stopper pawl, hinged in a sturdy frame and extending beyond the pivot. There it is prevented from rotating by a first release pin, which has locally a cut-out, such that the chain stopper pawl can be released by turning the release pin a quarter turn. This first release pin has attached to it a first lever resting against a similar but smaller second release pin, which can release the first lever by being turned a quarter turn. The second pin has attached to it a second lever, which rests against a sliding member which can release the second lever by being translated out of its way, either by hand or by a remotely operated translating device like an air or hydraulic cylinder.

Means for reading out the load on the chain can be provided in several places. Preferred is a load cell replacing one of the stops preventing the sliding member to rotate, but a load cell can also be mounted in the end of the chain stopper pawl, or the load can be measured by strain gauging the chain stopper pawl.

The foregoing and other objects, features and advantages of the present invention will be apparent from the following detailed description of a preferred embodiment of the invention, as illustrated in the accompanying drawings.

BRIEF DESCRIPTION OF THE DRAWINGS

In the drawings:

FIG. 3 is a plan view of the chain stopper assembly shown in FIG. 1, as indicated in that figure by arrows D. For clarity reasons the chain and the engaging-disengaging cylinder attached to the chain stopper pawl are not shown in this figure.

FIG. 4 is a section through the chain stopper assembly as indicated by arrows B in FIG. 2.

FIGS. 6, 7 and 8 show various ways in which the end of the chain stopper pawl, the end of the lever attached to the first pin and the pins on which they rest can be shaped, different from the shapes shown in the preferred embodiment.

Figure 1:
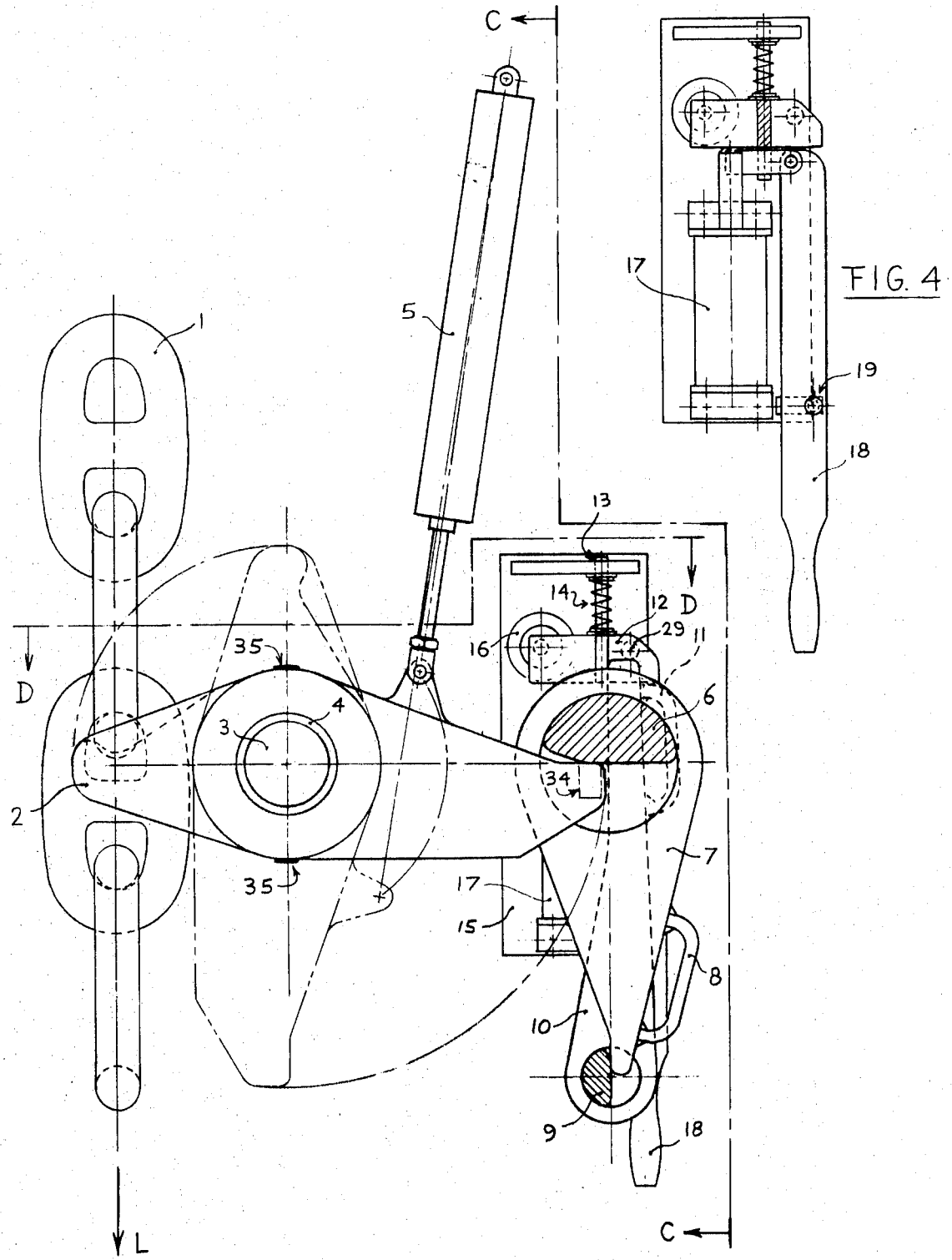
FIG. 1 is a section through a chain stopper assembly, as indicated in FIG. 2 with arrows A, constructed in accordance with the teachings of the present invention and shown in engaged position, the direction of the load on the chain being indicated by the arrow L.
Figure 2:
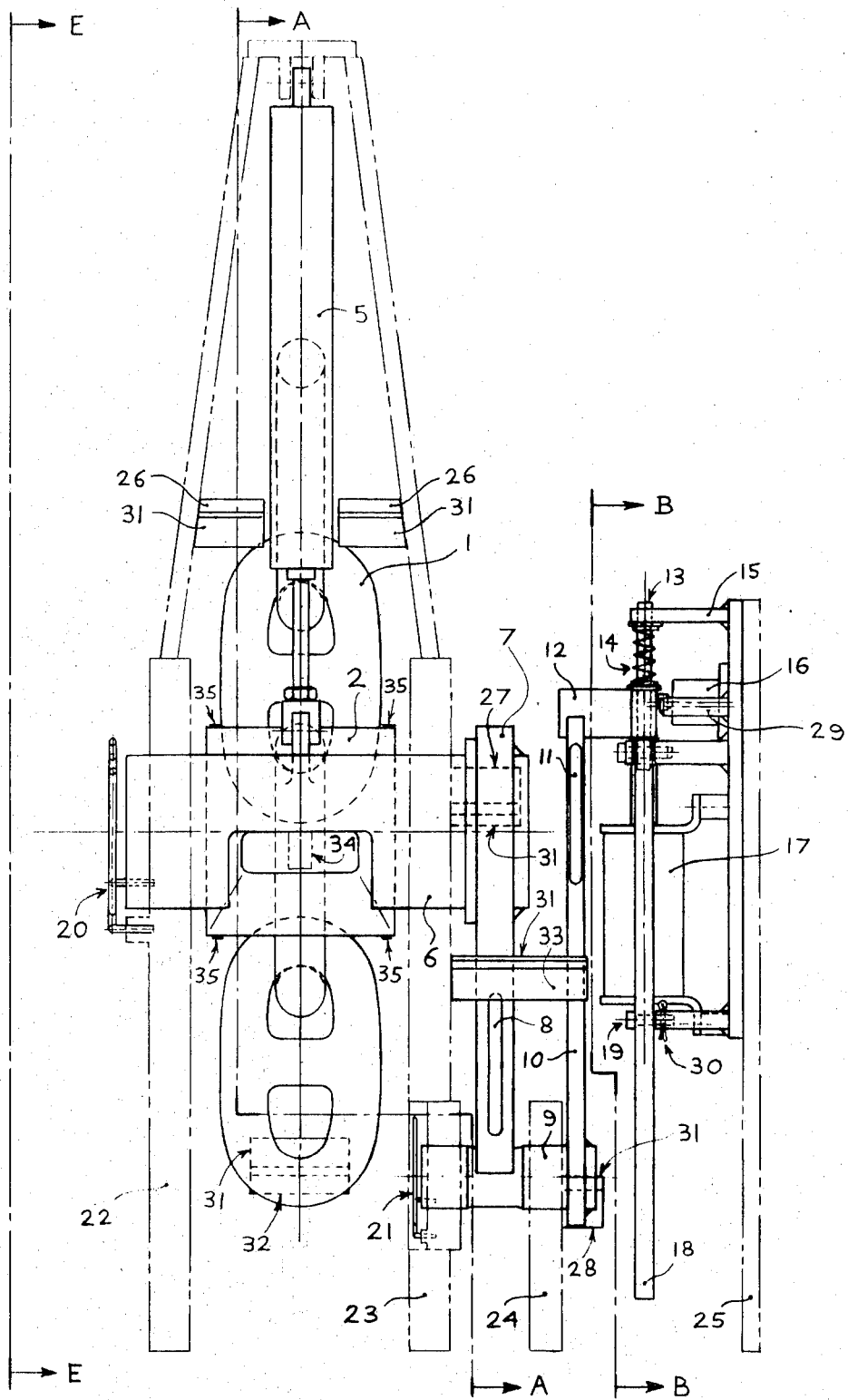
FIG. 2 is an end view of the chain stopper assembly shown in FIG. 1, as indicated in that figure by arrows C.
Figure 5:
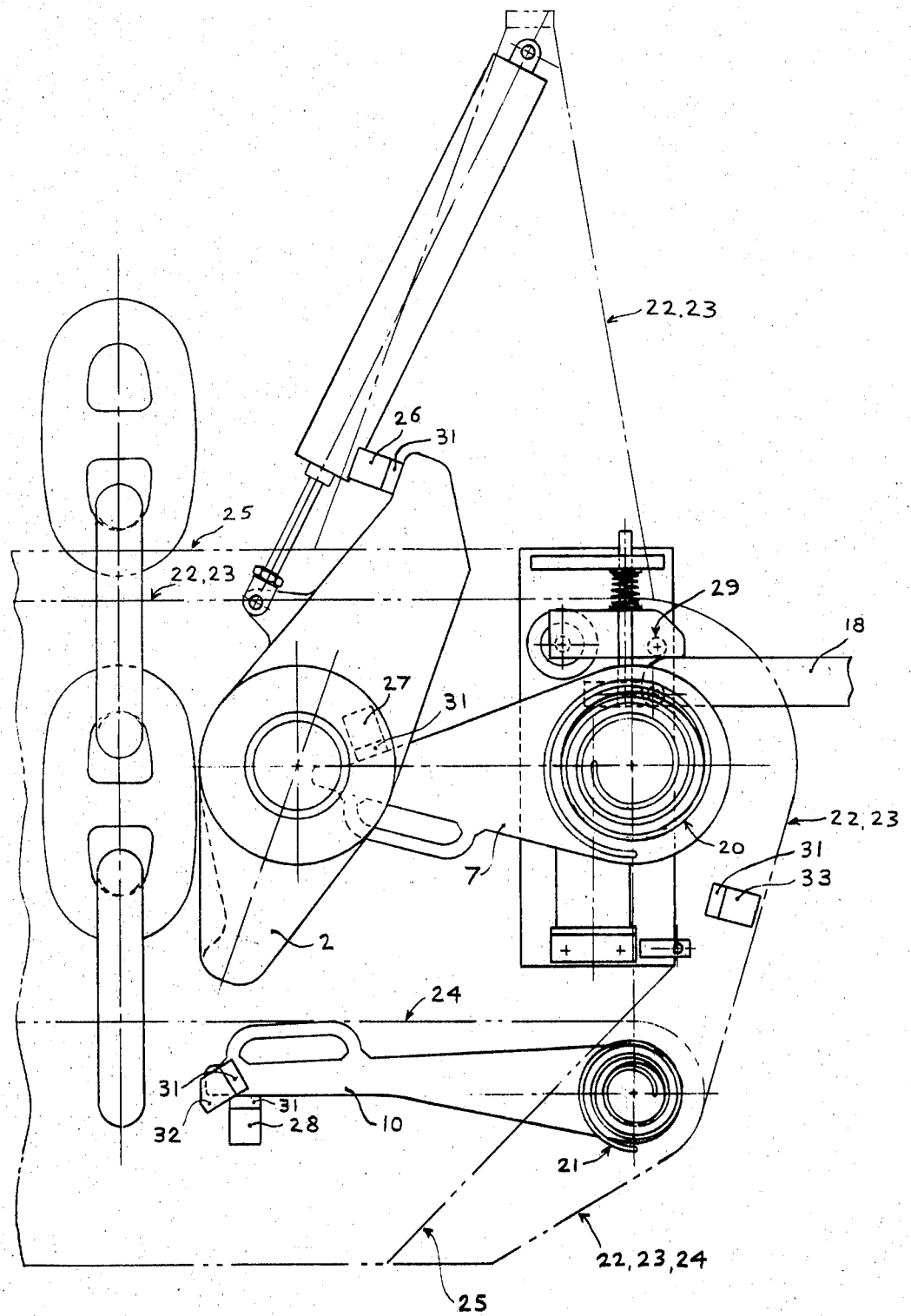
FIG. 5 is a side elevation of the chain stopper assembly as indicated by arrows E in FIG. 2, and shown in released position.

For clarity reasons the frame members were omitted from FIGS. 1 and 4 and shown only schematically in phantom in FIGS. 2, 3 and 5.

DESCRIPTION OF THE PREFERRED EMBODIMENT

Referring now to the drawings, there is shown in FIGS. 1 and 2 a chain 1, hanging in a chain stopper pawl 2, (see FIG. 3 for its plan form), hinged with a pin 3 and possibly a bushing 4 into two sturdy frame members 22 and 23. To engage and disengage it in unloaded condition, a cylinder 5 is attached to chain stopper pawl 2, shown in FIG. 1 in engaged as well as disengaged position, the latter with phantom lines.

The chain stopper pawl 2 rests with its end against a flat on an otherwise round pin 6. This flat is made such that the chain stopper can be released under load by allowing the pin to turn a quarter turn to the right.

The load on the chain 1 will push the end of the chain stopper pawl 2 against the flat of pin 6 and thereby try to rotate it, but due to the short distance from the contact point to the center line of the pin, the moment on the pin will be much smaller than the moment on the chain stopper pawl.

To further reduce this moment, a lever 7 is attached to pin 6, which rests with its end against a flat on an otherwise round pin 9, shaped basically the same as pin 6 and in the same way capable of releasing lever 7 under load by turning a quarter turn to the left.

The pin 9 has attached to it a lever 10, which rests with its end against a sliding member 12, which can slide along a pin 13, located in a bracket 15 attached to frame member 25, but is normally held down with a spring 14.

To release lever 10 under load, the sliding member 12 can be pushed up, either by an air or hydraulic cylinder 17 or a hand-lever 18, both attached to bracket 15. (See FIG. 4 for the unreleased position of members 12, 17 and 18.) As member 12 is pushed up, there is nothing to prevent the second release pin 9 and the second lever 10 to turn under pressure exerted on them by the first lever 7. After pin 9 is turned a quarter turn, lever 7 and first release pin 6 will in turn be free to rotate under the pressure of the chain stopper pawl, which in turn will be free to release the chain after it has turned pin 6 a quarter turn. (See FIG. 5 for the position of the various parts of the chain stopper assembly after release.) To prevent inadvertent operation, the handlever 18 can be locked in place with a lockpin 19, which is kept in place with a cotterpin 30.

Rotation of the sliding member 12 under the load from lever 10, is prevented in this embodiment by a load cell 16 attached to bracket 15, which at the same time can give a load read-out. If this load read-out is not desired, the load cell can of course be replaced with a piece acting only as a stop. A stop 29, attached to bracket 15, is provided to prevent the sliding member 12 to turn more than a few degrees in the other direction, which will facilitate reset of the chain stopper assembly after release.

After release the chain stopper pawl 2 will be limited in its movement by a pair of stops 26, attached to the frame and covered with a shock-absorbing pad 31 (see FIGS. 2 and 5). The movement of the levers 7 and 10 will be limited similarly by stops 27 and 28 respectively, both attached to the frame and covered with shock-absorbing pads 31. It will also be advisable to attach to the frame rebound stops 32 and 33, covered with shock-absorbing pads 31; stop 32 to prevent the chain stopper pawl from rebounding too far in the other direction and possibly damaging cylinder 5; stop 33 to prevent levers 7 and 10 from rebounding too far in the other direction and possibly hurting people standing behind the chain stopper assembly. For clarity reasons the stops 26, 27, 28, 32 and 33 are only shown in FIGS. 2 and 5.

To facilitate reset of the chain stopper assembly, handles 8 and 11 are attached to the levers 7 and 10 respectively. To prevent levers 7 and 10 to move out of position after reset, torsion springs 20 and 21 are attached to the corresponding pins, pushing the levers attached to the pins against the parts mating with the ends of the levers.

If the load cell 16 is located as shown in this preferred embodiment, it will be necessary to use anti-friction bearings for the pins 6 and 9, in order to get a reasonable accurate read-out. The accuracy could be improved even more by using anti-friction bearings on pin 13 supporting sliding member 12, and on pin 3 supporting the chain stopper pawl.

The need for anti-friction bearings on pins 6 and 9 and possibly 13 could be eliminated by positioning a load cell 34 in the end of the chain stopper pawl. The reasons this is not preferred are, that at the present state of the art such a load cell would be significantly larger than shown, would require therefore a larger cutout in the chain stopper pawl with corresponding stress concentrations, the load cell would be much more subject to damage than in the preferred position due to the sliding under high pressure of the end of the chain stopper pawl over the flat on the release pin, and the wiring to the load cell would be subjected to bending whenever the chain stopper is engaged, disengaged or released, increasing the chances for failure due to fatigue breaks in the wiring and its connections.

Another possibility would be to locate the load cell in the pin 6 opposite the end of the chain stopper pawl 2. This however would create the same problems as described in the previous paragraph.

Finally it will be possible to place strain gauges on the chain stopper pawl 2, using the strains caused by the loading as a measure for this loading. Four strain gauges 35 are shown in FIGS. 1 and 2, as just one way of doing this, by measuring the bending strain. Each one in itself could already be a measure for the load, but by using all four a more accurate read-out is possible by averaging out their values. Ways to do this are common knowledge for experts in the field of strain gauging and can be considered part of the present state of the art.

The flats on pins 6 and 9 and the mating flats on chain stopper pawl 2 and lever 7 can be shaped differently than in the preferred embodiment as shown in FIGS. 6, 7 and 8. All three have in common that one of the surfaces is curved, thus better defining the place where the contact will be than is possible with both mating sides being flat as shown in the preferred embodiment. Of course the latter could be shaped slightly curved after machining by hand lapping. Also it will be possible to shape both mating surfaces curved.

FIGS. 6 and 7 further show that more than half of the pin is removed, making it possible to have the line perpendicular to the contact surfaces at the contact point to go through the center line of the pin and therefore not causing any moment on the pin. Springs like springs 20 and 21 shown in the preferred embodiment, will have to be provided then to turn the release pins when release is required. FIG. 7 is probably not a very practical shape due to the very weakened cross section of the pin, but is shown mainly as a logic step to the configuration in FIG. 8, where the pin is built like a crankshaft, but of course used here to provide a means for releasing the chain stopper under load.

For not too large loads it will be possible to simplify the design by omitting the second pin 9 and lever 10, and locating the sliding member 12 and its related parts on bracket 15 directly on lever 7. For very large loads it will be possible to reduce the loading on the sliding member further by adding one or more sets of pin-levers.

While the invention has been described and illustrated herein with reference to the preferred embodiment thereof, it will be understood by those skilled in the art that various changes in form and details may be made therein, as shown in a few places by the inventor, without departing from the spirit and scope of the invention.

What is claimed is:

1. An under load releasable chain stopper of the kind having a two-legged fork-shaped chain stopper pawl for holding the chain, comprising
   a. a two-legged fork-shaped chain stopper pawl
   b. a frame
   c. a first means mounting said chain stopper pawl in said frame so as to allow said chain stopper pawl to rotate with respect to said frame,
   d. a first pin rotatably supported in said frame, said first pin having a first indentation and being located such that said chain stopper pawl, when engaging with its forked end the chain, can go with its other end into said first indentation and rest there against said first pin, e. a first lever attached to said first pin, this first lever together with the to it attached first pin being able to release said chain stopper pawl by rotation over approximately one quarter turn, f. a second pin rotatably supported in said frame, said second pin having a second indentation and being located such that said first lever can go with its end into this second indentation and rest there against said second pin, when said first lever is in the position that the engaged chain stopper pawl can rest into the first indentation on said first pin attached to said first lever, g. a second lever, attached to said second pin, this second lever together with the to it attached second pin being able to release said first lever and thereby indirectly said chain stopper pawl by rotation over approximately one quarter turn, h. a member which is supported in said frame by second means such that said second lever can rest with its end against said member when said second lever is in such position that said first lever can rest with its end into the second indentation on said second pin, said member being operatively connected with third means which can release said second lever and thereby indirectly said first lever and chain stopper pawl, by shifting said member out of the way of said second lever.

2. An under load releasable chain stopper of the kind having a two-legged fork-shaped chain stopper pawl for holding the chain, comprising a. a two-legged fork-shaped chain stopper pawl
b. a frame
c. a first means mounting said chain stopper pawl in said frame so as to allow said chain stopper pawl to rotate with respect to said frame,
d. a first pin rotatably supported in said frame, said first pin having a first indentation and being located such that said chain stopper pawl, when engaging wth its forked end the chain, can go with its other end into said first indentation and rest there against said first pin,
e. a first lever attached to said first pin, this first lever together with the to it attached first pin being able to release said chain stopper pawl by rotation over approximately one quarter turn,
f. a second pin rotatably supported in said frame, said second pin having a second indentation and being located such that said first lever can go with its end into this second indentation and rest there against said second pin, when said first lever is in the position that the engaged chain stopper pawl can rest into the first indentation on said first pin attached to said first lever,
g. a second lever, attached to said second pin, this second lever together with the to it attached second pin being able to release said first lever and thereby indirectly said chain stopper pawl by rotation over approximately one quarter turn,
h. a member which is supported in said frame by second means such that said second lever can rest with its end against said member, when said second lever is in such position that said first lever can rest with its end into said second indentation on said second pin,
i. a handlever and a cylinder attached to said frame, such that they can shift said member out of the way of said second lever, independent of each other, thereby releasing said second lever and indirectly releasing said first lever and chain stopper pawl.

3. An under load releasable chain stopper of the kind having a two-legged fork-shaped chain stopper pawl for holding the chain, comprising a. a two-legged fork-shaped chain stopper pawl
b. a frame
c. a first means mounting said chain stopper pawl in said frame so as to allow said chain stopper pawl to rotate with respect to said frame,
d. a first pin rotatably supported in said frame, said first pin having a first indentation and being located such that said chain stopper pawl, when engaging with its forked end the chain, can go with its other end into said first indentation and rest there against said first pin,
e. a first lever attached to said first pin, this first lever together with the to it attached first pin being able to release said chain stopper pawl by rotation over approximately one quarter turn,
f. a second pin rotatably supported in said frame, said second pin having a second indentation and being located such that said first lever can go with its end into this second indentation and rest there against said second pin, when said first lever is in the position that the engaged chain stopper pawl can rest into the first indentation on said first pin attached to said first lever,
g. a second lever, attached to said second pin, this second lever together with the to it attached second pin being able to release said first lever and thereby indirectly said chain stopper pawl by rotation over approximately one quarter turn,
h. a member which is supported in said frame by second means such that said second lever can rest with its end against said member, when said second lever is in such position that said first lever can rest with its end into said second indentation on said second pin, said member being operatively connected with third means which can release said second lever and thereby indirectly said first lever and chain stopper pawl, by shifting said member out of the way of said second lever,
i. said second means containing a third pin positioned with fourth means into said frame, said third pin rotatably supporting said member, such that said member would rotate around said third pin under the pressure from said second lever, this rotation however being prevented by a load cell, the pressure on this load cell being a measure for the load on the chain.

4. An under load releasable chain stopper of the kind having a two-legged fork-shaped chain stopper pawl for holding the chain, comprising a. a two-legged fork-shaped chain stopper pawl
b. a frame
c. a first means mounting said chain stopper pawl in said frame so as to allow said chain stopper pawl to rotate with respect to said frame,
d. a first pin rotatably supported in said frame, said first pin having a first indentation and being located such that said chain stopper pawl, when engaging with its forked end of the chain, can go with its other end into said first indentation and rest there against said first pin, e. a first lever attached to said first pin, this first lever together with the to it attached first pin being able to release said chain stopper pawl by rotation over approximately one quarter turn, f. a second pin rotatably supported in said frame, said second pin having a second indentation and being located such that said first lever can go with its end into this second indentation and rest there against said second pin, when said first lever is in the position that the engaged chain stopper pawl can rest into the first indentation on said first pin attached to said first lever, g. a second lever, attached to said second pin, this second lever together with the to it attached second pin being able to release said first lever and thereby indirectly said chain stopper pawl by rotation over approximately one quarter turn, h. a member which is supported in said frame by second means such that said second lever can rest with its end against said member, when said second lever in in such position that said first lever can rest with its end into said second indentation on said second pin, said member being operatively connected with third means which can release said second lever and thereby indirectly said first lever and chain stopper pawl, by shifting said member out of the way of said second lever, i. a first spring, attached to said frame, acting on the assembly of said first pin and said first lever such that said first pin and first lever assembly will stay in its set position, even if said chain stopper pawl is unloaded or disengaged, and said first pin and first lever assembly will be turned by the spring to the position which releases said chain stopper pawl, when said second pin releases with said first lever and first pin assembly, j. a second spring, attached to said frame, acting on the assembly of said second pin and said second lever such that said second pin and second lever assembly will stay in its set position, even if said chain stopper pawl is unloaded or disengaged, and said second pin and second lever assembly will be turned by the spring to the position which releases said first lever and first pin assembly, when said member releases said second lever and second pin assembly.

5. An under load releasable chain stopper of the kind having a two-legged fork-shaped chain stopper pawl for holding the chain, comprising a two-legged fork-shaped chain stopper pawl b. a frame c. a first means mounting said chain stopper pawl in said frame so as to allow said chain stopper pawl to rotate with respect to said frame, d. a pin rotatably supported in said frame, the ends of said pin are journaled in said frame and said pin having an indentation therein, said indentation comprising a substantially flat surface parallel to the longitudinal axis of said pin and which passes approximately through the center of said pin and being located such that said chain stopper pawl, when engaging with its forked end the chain, can go with its other end unto said surface and rest there against said pin, e. a lever attached to said pin, this lever together with the to it attached pin being able to release said chain stopper pawl by rotation over approximately one quarter turn, f. a member which is supported in said frame by second means, such that said lever can rest with its end against said member, when said lever is in such position that the engaged chain stopper pawl can rest into the indentation on said pin, said member being operatively connected with third means which can release said lever and thereby indirectly said chain stopper pawl, by shifting said member out of the way of said lever.

6. An under load releasable chain stopper of the kind having a two-legged fork-shaped chain stopper pawl for holding the chain, comprising a. a two-legged fork-shaped chain stopper pawl b. a frame c. a first means mounting said chain stopper pawl in said frame so as to allow said chain stopper pawl to rotate with respect to said frame, d. a first pin rotatably supported in said frame, said first pin having a first indentation and being located such that said chain stopper pawl, when engaging with its forked end the chain, can go with its other end into said first indentation and rest there against said first pin, e. a first lever attached to said first pin, this first lever together with the to it attached first pin being able to release said chain stopper pawl by rotation over approximately one quarter turn, f. a second pin rotatably supported in said frame, said second pin having a second indentation and being located such that said first lever can go with its end into this second indentation and rest there against said second pin, when said first lever is in the position that the engaged chain stopper pawl can rest into the first indentation on said first pin attached to said first lever, g. a second lever, attached to said second pin, this second lever together with the to it attached second pin being able to release said first lever and thereby indirectly said chain stopper pawl by rotation over approximately one quarter turn, h. a third pin, rotatably supported in said frame, said third pin having a third indentation and being located such that said second lever can go with its end into this third indentation and rest there against said third pin, when said second lever is in the position that said first lever can rest with its end into the indentation on said second pin attached to said second lever, i. a third lever, attached to said third pin, this third lever together with the to it attached third pin, being able to release said second lever and thereby indirectly said first lever and chain stopper pawl, by rotation over approximately one quarter turn, j. a member which is supported in said frame by second means, such that said third lever can rest with its end against said member when said third lever is in such position that said second lever can rest with its end into the third indentation on said third pin, said member being operatively connected with third means which can release said third lever and thereby indirectly said second lever, first lever and chain stopper pawl, by shifting said member out of the way of said third lever.

* * * * *